United States Patent
Grant (10) Patent No.: US 7,891,271 B2
(45) Date of Patent: Feb. 22, 2011

(54) SLIDE LOCKING MOTORCYCLE KICK ARM (76) Inventor: John Grant, 1412 SE. 83rd St., Vancouver, WA (US) 98664

( * ) Notice: Subject to any disclaimer, the term of this patent is extended or adjusted under 35 U.S.C. 154(b) by 1030 days.

(21) Appl. No.: 11/657,980

(22) Filed: Jan. 24, 2007

(65) Prior Publication Data

US 2007/0137401 A1 Jun. 21, 2007

(51) Int. Cl.
*B62M 3/00* (2006.01)
(52) U.S. Cl. .................. 74/594.7; 74/547; 123/185.5
(58) Field of Classification Search .......... 123/185.5; 74/512, 572, 594.7, 547, 544; 16/429, 438; 280/293, 304, 298
See application file for complete search history.

(56) References Cited

U.S. PATENT DOCUMENTS

| | | | | |
|---|---|---|---|---|
| 1,059,884 A | * | 4/1913 | Link ............................. 74/550 |
| 1,330,260 A | * | 2/1920 | Graham et al. ................. 74/547 |
| 2,470,414 A | * | 5/1949 | Rippenbein ................. 74/594.4 |
| 2,677,975 A | * | 5/1954 | Russell ......................... 74/547 |
| 2,723,329 A | * | 11/1955 | Baird .......................... 200/330 |
| 3,533,389 A | | 10/1970 | Harker |
| 4,030,561 A | * | 6/1977 | Hashimoto et al. .......... 180/219 |
| 4,531,715 A | * | 7/1985 | Wiens ......................... 254/266 |
| 4,552,034 A | * | 11/1985 | Bertani et al. ................. 74/547 |
| 5,085,433 A | * | 2/1992 | Parsons ..................... 463/47.6 |
| 5,443,570 A | * | 8/1995 | Hirano ........................ 242/284 |
| 5,513,544 A | * | 5/1996 | Winkler et al. ................. 74/547 |
| 5,647,095 A | * | 7/1997 | Takimoto ..................... 16/405 |
| 5,676,349 A | * | 10/1997 | Wilson ........................ 254/266 |
| 7,712,393 B2 | * | 5/2010 | Bertani ......................... 74/547 |

* cited by examiner

*Primary Examiner* — Richard W Ridley
*Assistant Examiner* — Alan B Waits
(74) *Attorney, Agent, or Firm* — Rylander & Associates P.C.; Mark E. Beatty; Kurt M. Rylander (57) ABSTRACT

A slide locking motorcycle kick arm with a foot pedal and a kick arm shaft that is attachable to an engine kick starter, where the foot pedal can rotate to be in the kick start position and rotated out of the way when kick starting is completed. The foot pedal can be locked in either position, only when the foot pedal slides to the end of the kick arm shaft, and can be locked in the rotated position.

6 Claims, 9 Drawing Sheets

SLIDE LOCKING MOTORCYCLE KICK ARM

FIELD OF THE INVENTION

Applicant's slide locking motorcycle kick arm relates to apparatus for manually starting small internal combustion engines.

BACKGROUND

Motorcycle kick arms are used to manually turn the crank of an internal combustion engine over such that the engine will start. Kick arms are also commonly used on other vehicles and apparatus with smaller engines where battery powered starters are undesirable due to weight, space or cost considerations, such as snowmobiles, all terrain vehicles, scooters, and other apparatus. Kick arms utilize a pedal connected to the kick arm, which the user actuates to force the kick arm to turn the engine over. Some motorcycles are equipped with electric starters which perform this function, and some motorcycles have both an electric starter and the option to start the engine manually by use of a kick arm. Kick arms are currently available but make use of a pedal pivotally connected to the kick arm, which when not in use is pivoted to a storage position. Current kick arm pedals are prone to drift from the storage position due to vibration or wind when the motorcycle is in use. This poses usability and safety problems for the operator of the motorcycle. Thus there is a need for kick arms that prevent the kick arm pedal from drifting from the storage position when the motorcycle is in use or when the kick arm is not in use.

A number of devices have provided motorcycle kick arms, but the art has not addressed these problems. The following represents a list of known related art:

| Reference: | Issued to: | Date of Issue: |
|---|---|---|
| U.S. Pat. No. 3,533,389 | Harker | Oct. 13, 1970 |

The teachings of each of the above-listed citations (which do not itself incorporate essential material by reference) are herein incorporated by reference. None of the above inventions and patents, taken either singularly or in combination, is seen to describe the slide locking kick arm as claimed. U.S. Pat. No. 3,533,389 to teaches a fairly conventional layout for a kick arm, where the foot pedal pivots out of the way, but is prone to drift due to vibration.

Thus, there is a need for a slide locking kick arm apparatus that stows completely out of the way, such that there is no danger of the pedal drifting out to interfere with the operator. There is also a need for a slide locking kick arm apparatus which can be operated with one hand and does not require tools to use. There is also a need for a slide locking kick arm apparatus which is designed to clear engine air filter and exhaust components. Still other features would be desirable in a motorcycle kick arm, such as the ability to lock or prevent the kick arm pedal from drifting from the storage position when not in use.

Thus, while the foregoing body of art indicates it to be well known to have a motorcycle kick arm, the art described above does not teach or suggest a motorcycle kick arm which has the desirable feature of preventing the kick arm pedal from drifting from the storage position when not in use.

SUMMARY AND ADVANTAGES

A slide locking kick arm is presented which includes a first connecting means, a second connecting means, a locking means, a kick arm shaft, and a foot pedal, wherein the kick arm shaft includes a first part attachable to an engine kick starter using said first connecting means, and a second part extending from said first part slidably attachable within said foot pedal using said second connection means, and wherein the second connecting means further includes rotating means which allow said foot pedal to rotate outward approximately ninety (90) degrees only when said foot pedal is slid to the distal end of said second part of said kick arm shaft; and wherein the foot pedal can be locked in its rotated position using said locking means.

A slide locking kick arm may include a kick arm shaft attachable to an engine kick starter at a first end of the shaft, said shaft including a first angled part connected to the first end, and a second part for receiving a foot pedal extending from said first part, said second part comprising an enclosed slot extending substantially the entire length of said second part, a distal end wall, a distal end locking corner, a foot pedal slidingly attachable over the shaft second part, said foot pedal including a first cavity including an opening at one end for receiving said kick arm shaft second part, a second cavity extending from the opening of said first cavity, the second cavity including a posterior wall, a posterior lip, two opposing lateral walls extending from said posterior wall, said lateral walls including penetrations for receiving a pedal connector, and an anterior lip connecting the two lateral walls, said anterior lip located opposite from said posterior lip across the opening of said first cavity, and, a pedal connector axle connecting through said sidewall penetrations and interior slot, wherein when said foot pedal is extended said foot pedal can be rotated away from said engine starter, thereby resting said posterior wall against the distal end wall of said shaft second part, and resting said anterior lip against an exterior surface of said shaft second part, engaging said distal end locking corner against said posterior lip.

A slide locking kick arm can include a locking pin and locking pin handle, wherein said locking pin extends from the handle slidably through the closed end of said foot pedal, down the length of said first cavity, and partly into said second cavity, a fixed support plate fixedly connected to said locking pin, positioned within said first cavity of said foot pedal, a locking pin spring within said first cavity extending along said locking pin between said fixed support plate and the closed end of said first cavity, a sliding support plate slidably attachable to said locking pin between said fixed support plate and the distal end of said locking pin; and further wherein, said kick arm shaft second part further comprises a locking pin receiving hole through said distal endwall and a locking pin locking hole through a sidewall of enclosed slot.

Applicant's motorcycle kick arm for turning over internal combustion engines such that the engine starts, includes an arm attached perpendicular to the transmission kick shaft, a pedal rotatably connected to the kick arm, where said pedal contains a hollow portion such that when not in use the pedal can slide over the kick arm so as to be out of the way and prevent the pedal from drifting during operation of the motorcycle. In one embodiment, the kick arm contains a channel along the length of the kick arm allowing the pedal to slide into the storage position where said pedal slides over the kick arm longitudinally and allowing the pedal to slide out of the storage position and rotate perpendicular to the kick arm such that rotation of the kick arm about the kick shaft axis is achieved when the user applies force to the pedal. The pedal is secured to the kick arm by a bolt In another embodiment the pedal is secured to the kick arm by a spring and bolt housed internal to the pedal and longitudinal to the kick arm when the pedal is in the storage position. The spring applies force to the pedal to keep it in the storage position when not in use.

Applicant's slide locking motorcycle kick arm presents numerous advantages, including: (1) the ability to secure the pedal in the storage position and (2) the ability to prevent the pedal from drifting from the storage position when not in use. Additional advantages will be set forth in part in the description which follows, and in part will be obvious from the description, or may be learned by practice of the invention. The advantages of the invention may be realized and attained by means of the instrumentalities and combinations particularly pointed out in the appended claims. Further benefits and advantages of the embodiments of the invention will become apparent from consideration of the following detailed description given with reference to the accompanying drawings, which specify and show preferred embodiments of the present invention.

BRIEF DESCRIPTION OF THE DRAWINGS

The accompanying drawings, which are incorporated into and constitute a part of this specification, illustrate one or more embodiments of Applicant's slide locking motorcycle kick arm and, together with the detailed description, serve to explain the principles and implementations of the invention.

DETAILED DESCRIPTION

Before beginning a detailed description of the subject invention, mention of the following is in order. When appropriate, like reference materials and characters are used to designate identical, corresponding, or similar components in differing figure drawings. The figure drawings associated with this disclosure typically are not drawn with dimensional accuracy to scale, i.e., such drawings have been drafted with a focus on clarity of viewing and understanding rather than dimensional accuracy.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The slide locking kick arm is most useful for motorcycles with engine kick starters, but is applicable to similar motorized apparatus which use engine kick starters, such as scooters, snowmobiles, and three-wheel or four-wheel all-terrain-vehicles (ATV's). Therefore, where claims read "motorcycle" this term includes scooters, snowmobiles, and ATV's with kick starters.

As shown in FIGS. 1-4, a slide locking kick arm includes a kick arm shaft 10 attachable to an engine starter or transmission (T), and a foot pedal 26 slidably attached to kick arm shaft 10 using pedal engaging means 44.

Figure 1:
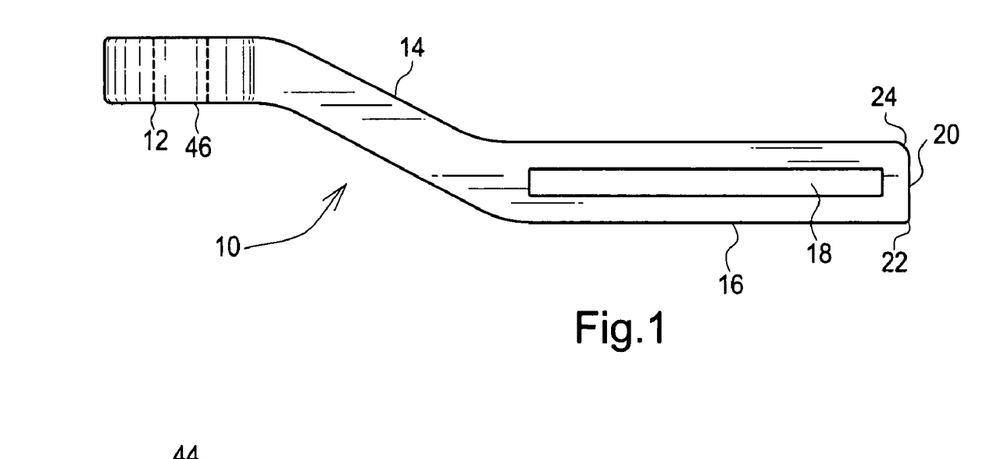
FIG. 1 shows a side view of a kick arm shaft with an enclosed slot.
Figure 1A:
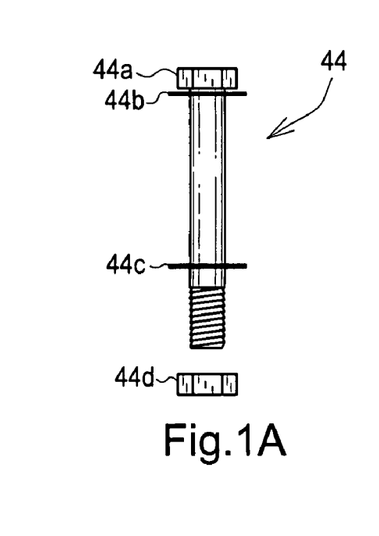
FIG. 1A shows a side view of a foot pedal connector.
Figure 3:
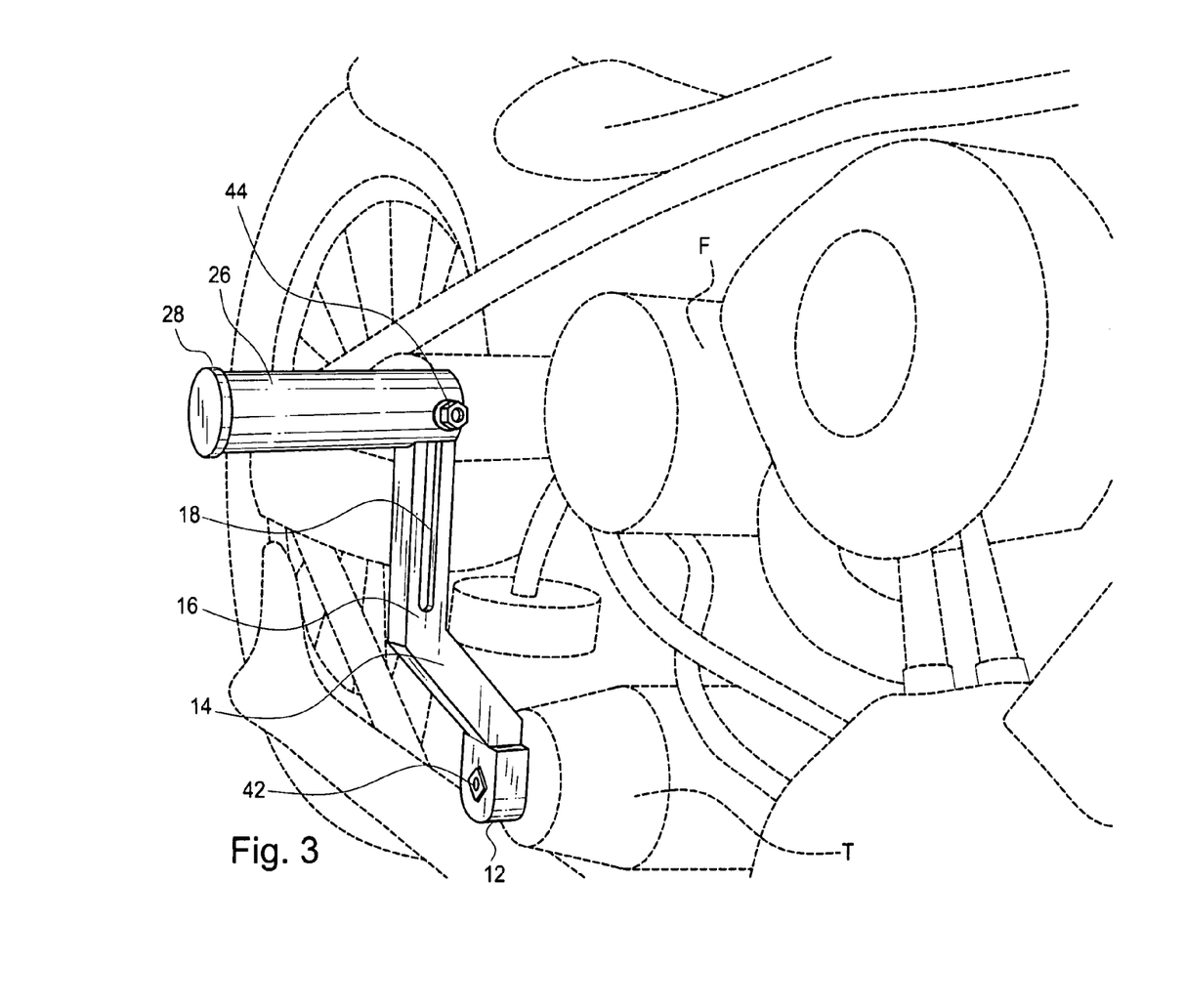
FIG. 3 shows a slide locking kick arm in the engaged position attached to a motorcycle.
Figure 4:
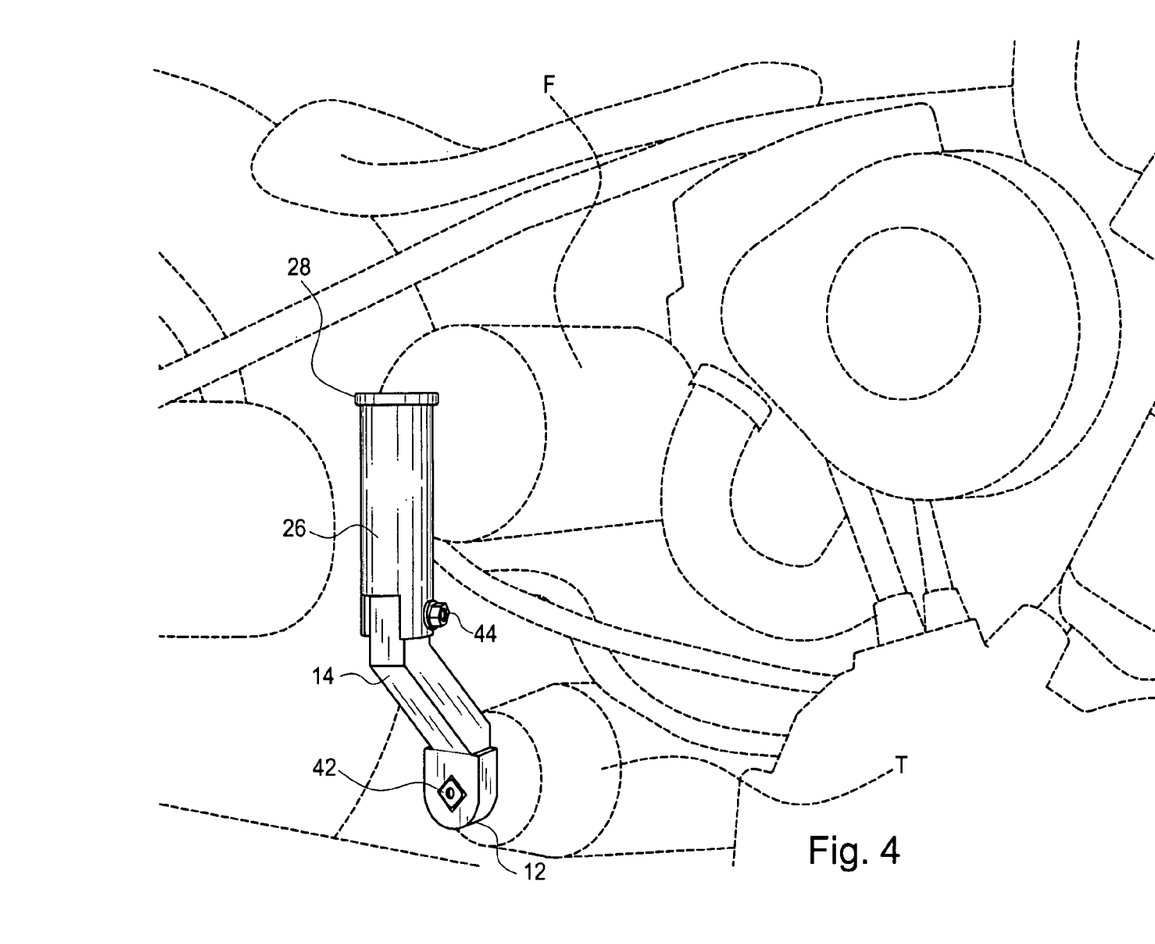
FIG. 4 shows a slide locking kick arm in the collapsed position attached to a motorcycle.

As seen in FIG. 1, a slide locking kick arm includes a first attachment portion 12 for attaching the shaft to an engine starter or transmission T through opening 46, a second slotted portion 16 for receiving foot pedal 26, a foot pedal 26 slidingly attachable to the kick arm shaft slotted portion 16 with second attachment means 44. As seen in FIGS. 3 and 4, foot pedal 26 can be rotated to a position approximately normal to an engine starter T to accept the foot of an operator when foot pedal 26 is slid to the extended distal position along kick arm shaft 10. Kick arm shaft 10 can include a first angled part 14 to offset pedal 26, thereby providing clearance around air filter F and exhaust components (not shown).

In one embodiment, shown in FIGS. 1-4, a slide locking kick arm has a kick arm shaft 10 with a first angled part 14 connected to a second part 16 with enclosed slot 18, distal endwall 20, distal locking corner 22, and distal rounded corner 24. First angled part 14 provides an offset so that foot pedal 26 will clear air filter F and the motorcycle exhaust components. On motorcycle models not requiring this offset, first angled part 14 and second slotted part 16 can form a continuous straight shaft without offset, or a continuous straight shaft angled out from connecting end 12.

Figure 1B:
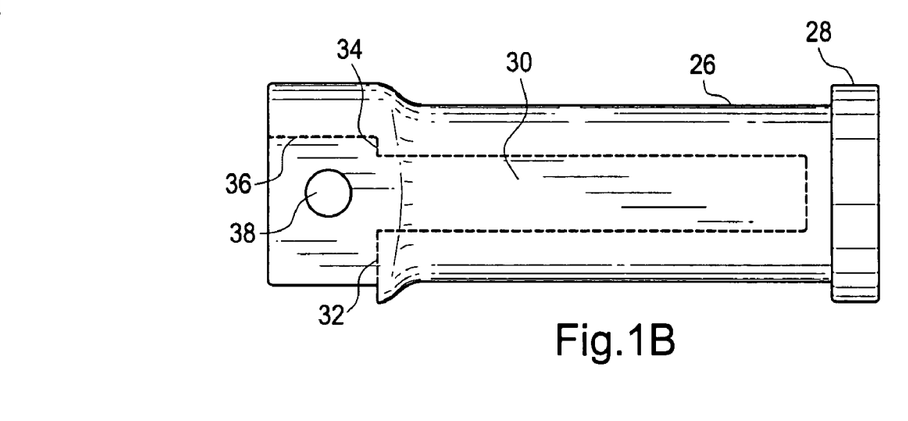
FIG. 1B shows a side view of a foot pedal.
Figure 2:
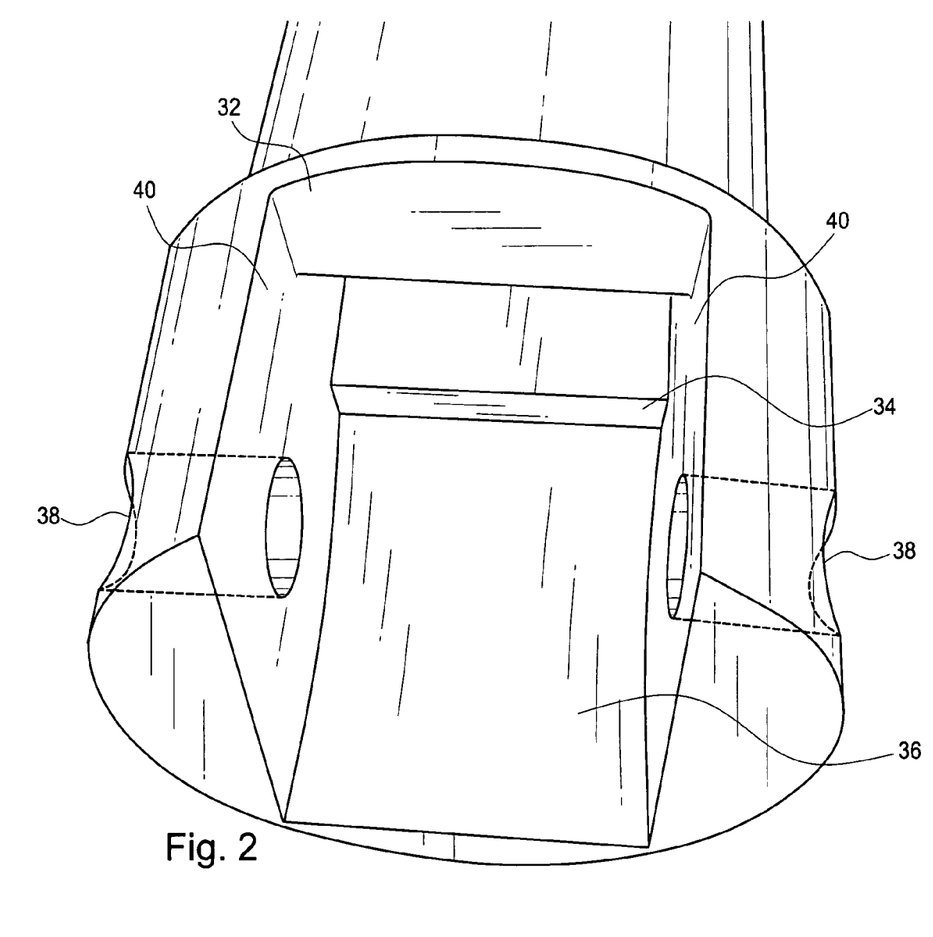
FIG. 2 shows a perspective view a foot pedal cavity.

Foot pedal 26 has a first cavity 30 which is open at one end and closed at the other end. The internal cross section of first cavity 30 approximates the cross section of the shaft second part 16, which in this embodiment is rectangular, to prevent foot pedal 26 from spinning. Other cross section shapes could be used to achieve the same effect, including other polygonal shapes or eccentric cross sections. First cavity 30 opens to a second open cavity bounded by posterior wall 36, lateral sidewalls 40, posterior lip 34, and anterior lip 32. Foot pedal 26 preferably includes a retaining lip 28 at the closed end to prevent the operator's foot from sliding off. Foot pedal 26 can also flare out around the opening of the second cavity to prevent the operators foot from sliding in that direction. Foot pedal 26 can include tread hatchings embedded into the exterior surface, or alternatively a slip-resistant material, such as rubber or epoxy "nonskid", can be applied. In another alternative, a removable rubber tread could be used. Foot pedal attachment means 44 includes axle 44a, which passes through lateral sidewall holes 38 and enclosed slot 18. Axle 44a is a shoulder bolt held in place by retaining bolt 44d, with washers 44b and 44c providing smooth rotation. Retaining bolt 44d is preferably a locknut. Different styles of bolts, rivets, or shafts known to those of skill in the art could also be used to achieve the same results.

In operation, a first embodiment is shown in its collapsed position in FIG. 4, attached to a Harley Davidson™ motorcycle. The slide locking kick arm is attached to the kick starter T through attachment hold 46 using fastener 42. Motorcycles typically use a square shaft to connect a kick arm to kick starter T, in order to prevent slip. Foot pedal 26 resides vertically, out of the way, enclosing kick arm shaft second part 16. The operator pulls foot pedal 26 vertically to its extended position, causing axle 44a to slide within enclosed slot 18. As shown in FIG. 2, foot pedal 26 is then rotated away from the motorcycle to its engaged position, approximately normal to the motorcycle itself. In this position, posterior wall 36 is contacting against distal endwall 20, and posterior lip 34 is locked against distal locking corner 22. Anterior lip 32 is resting against the exterior wall of enclosed channel 18. Thus, foot pedal 26 is locked in place and can accept the force of an operator's foot pushing down to crank the motorcycle engine. Distal rounded corner 24 is radiused to allow smooth rotation of foot pedal 26.

Figure 5:
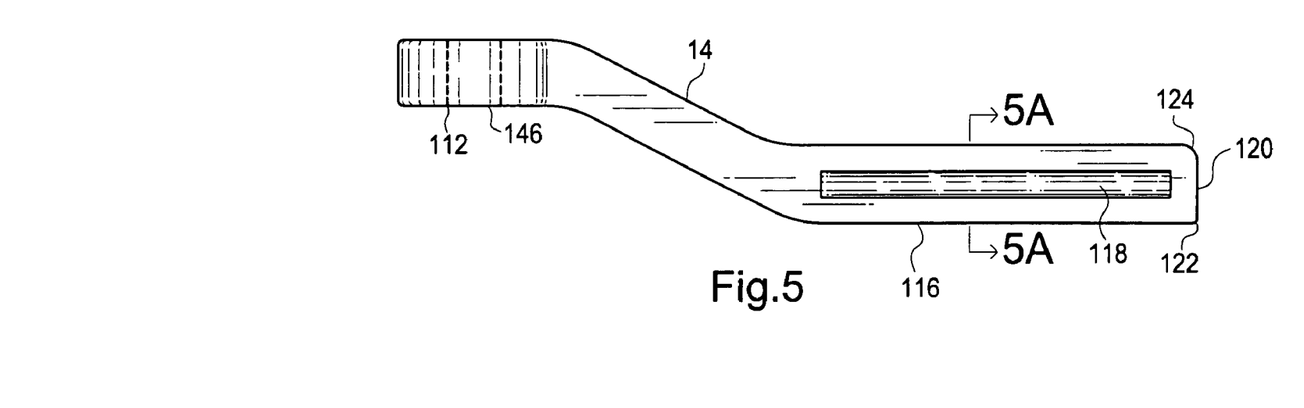
FIG. 5 shows a side view of a kick arm shaft with side channels.
Figure 5A:
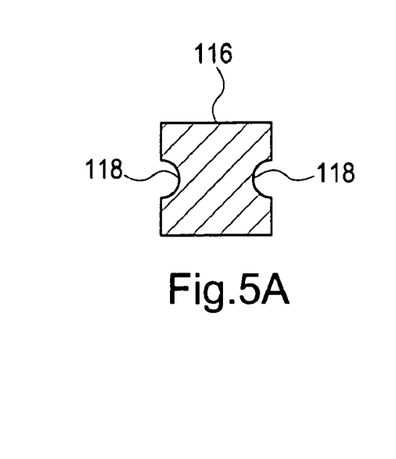
FIG. 5A shows cutaway end-view of a kick arm shaft with side channels.
Figure 5B:
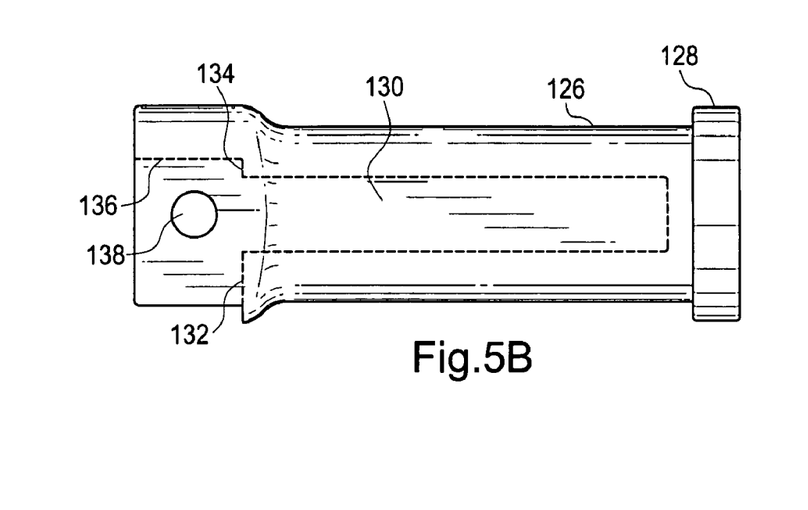
FIG. 5B shows a side view of a foot pedal.
Figures 6, 6A:
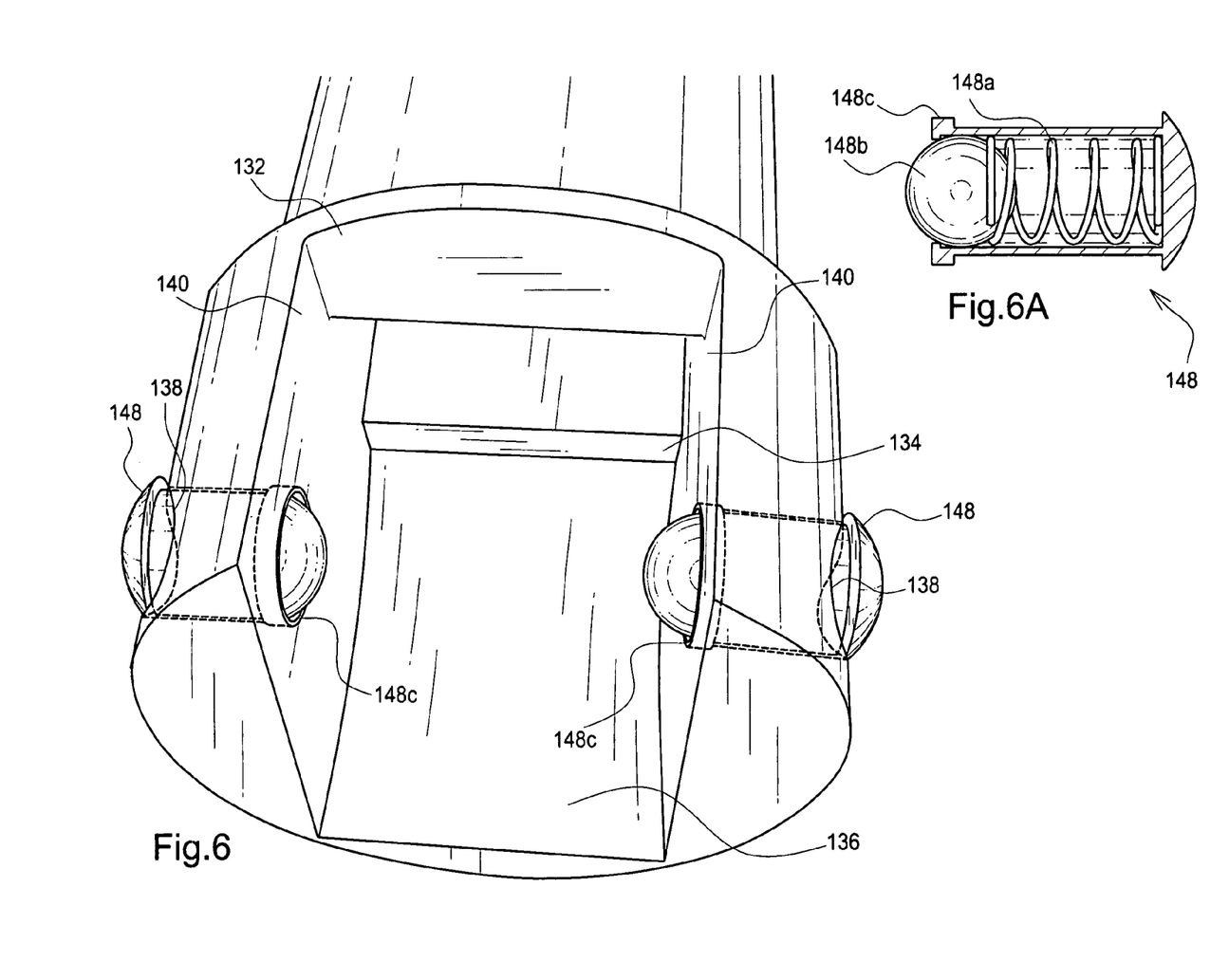
FIG. 6 shows a perspective view a foot pedal cavity.
FIG. 6A shows a cutaway side view of a pedal connector.

A second embodiment is shown in FIGS. 5-6 is similar in many respects to the previously described embodiment, but incorporates side channels 118 rather than an enclosed slot 18. A slide locking kick arm includes a kick arm shaft 110 which is attachable to a motorcycle kick starter T at first end 112, through hole 146. Shaft 110 includes a first angled part 114 and a second part 116 with one or more exterior lateral channels 118. Preferably two opposing channels 118 are provided for more reliable operation, but a single channel could be used. Additionally, multiple channels could be provided on a single side or opposing sides of shaft 116, depending on desired operating characteristics and manufacturing considerations known to those of ordinary skill in the art. Shaft second part 116 fits snugly within foot pedal first cavity 130 when collapsed.

Foot pedal 126 is slidingly attached to kick arm shaft 110 using two foot pedal connectors 148 on either side. Foot pedal connectors 148 are preferably round-headed hollow shaft studs with internal and external retaining lips 148c. The external lips lock the stud against lateral sidewalls 140, while the internal lips retain ball bearing 148b against spring 148a. Ball bearings 148b ride within channels 118, while the protrusion of lips 148c into channels 118 prevents foot pedal 126 from coming completely off shaft 116 during use. Lips 148c can be formed by pressing or by using a rivit gun, by threading connector 148 together from two parts, or other commonly known methods. Side channels 118 are preferably part-round cross sections to allow smooth operation of ball bearings 148b. Alternatively, pedal connectors 148 could simply consist of one or more studs or bolts extending into corresponding channels 118, without ball bearings, to save costs.

In operation, the second embodiment operates similarly to the first embodiment. The slide locking kick arm is attached to the kick starter through attachment hold 146 using a fastener. Foot pedal 126 stows vertically, out of the way, enclosing kick arm shaft second part 116. The operator pulls foot pedal 126 up vertically from its stowed position. The operator pulls foot pedal 126 vertically to its extended position, causing pedal connectors 148, with ball bearings 148b, to slide within opposing side channels 118. Foot pedal 126 is then rotated away from the motorcycle to its engaged position, approximately normal to the motorcycle itself. In this position, posterior wall 136 is contacting against distal endwall 120, and posterior lip 134 is locked against distal locking corner 122. Anterior lip 132 is resting against the a side of shaft 116. Thus, foot pedal 126 is locked in place and can accept the force of an operator's foot pushing down to crank the motorcycle engine. Distal rounded corner 124 is radiused to allow smooth rotation of foot pedal 126.

Figure 7:
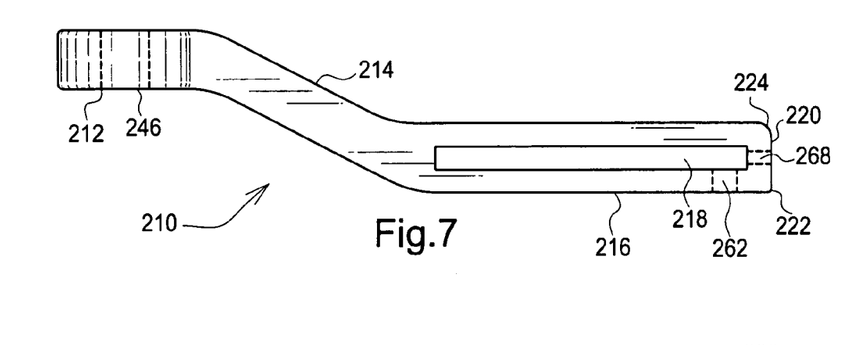
FIG. 7 shows a side view of a kick arm shaft.
Figure 7A:
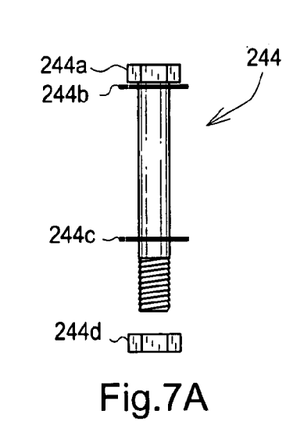
FIG. 7A shows a foot pedal connecter.
Figure 7B:
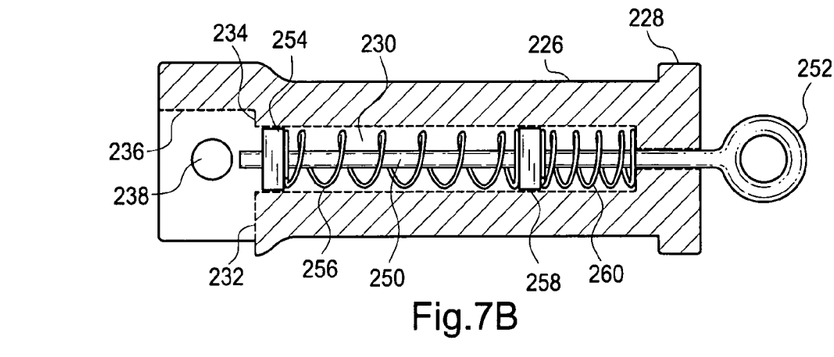
FIG. 7B shows an interior side view of a foot pedal with a locking pin mechanism.
Figure 7C:
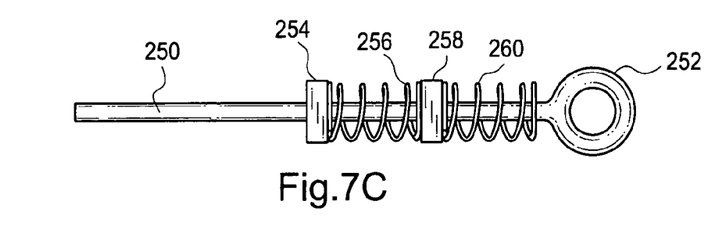
FIG. 7C shows a side view a foot pedal locking pin mechanism.
Figure 7D:
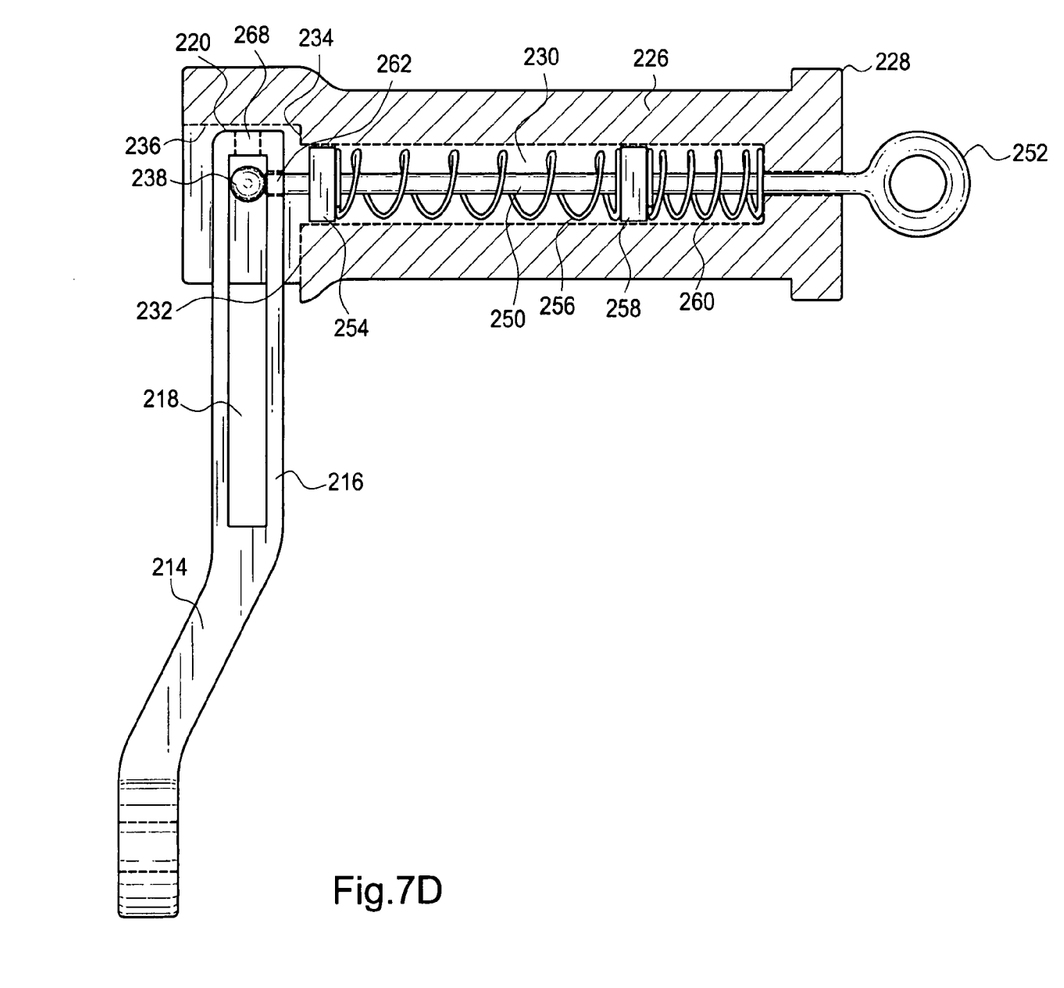
FIG. 7D shows a cutaway side view of a slide locking kick arm with a locking pin mechanism in the engaged position.
Figure 7E:
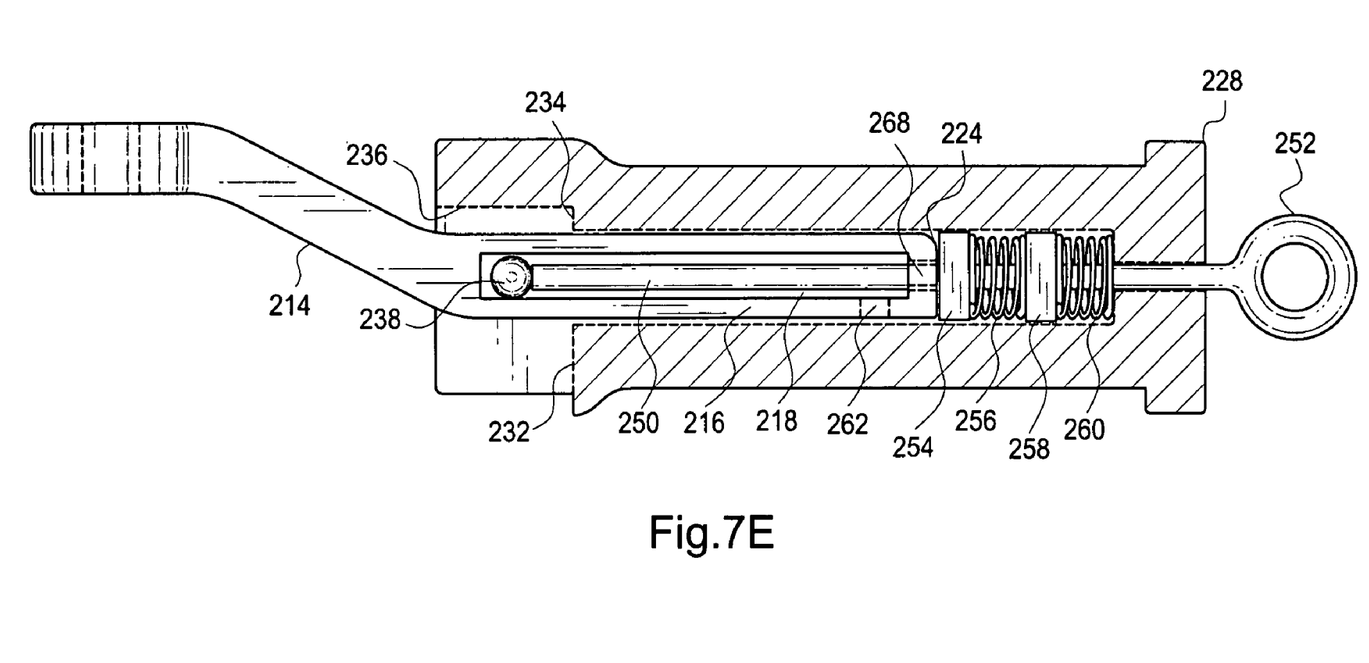
FIG. 7E shows a cutaway side view of a slide locking kick arm with a locking pin mechanism in the stowed position.

A third embodiment is shown in FIGS. 7-7E. In this embodiment foot pedal 226 is internally similar to the previous described embodiments. Locking pin 250 is provided to ensure the foot pedal remains locked in the engaged position during operation by acting through locking hole 262 through a sidewall of enclosed channel 218. Locking pin 250 includes a handle 252, which is preferably a closed loop. A closed loop is easier to grip with fingers than a post, or alternatively the operator could use a small hook, perhaps kept on a keyring, to grab the pin. Other convenient shapes could be used for handle 252 which are known to those of skill in the art. Locking pin 250 fits slidingly through the closed end of foot pedal 226, extending through first cavity 230 and partly into the second cavity opening out from first cavity 230. Fixed support plate 258 is rigidly attached to locking pin 250. Locking pin spring 260 is positioned between fixed support plate 258 and the closed end of cavity 230, while sliding support plate 254 is slidably attached to locking pin 250 on the other side of fixed support plate 258, allowing it to travel freely up and down the length of locking pin 250. A weak sliding support plate spring 256 can be included to ensure sliding plate 254 operates properly during use. Sliding support spring 256 should be selected so that the spring force when fully compressed does not exceed the weight of foot pedal 226 in order to prevent foot pedal 226 from inadvertently lifting. Alternatively, sliding support plate spring 256 could be eliminated for simplicity.

Referring to FIG. 7E, in the collapsed (i.e. vertical) condition, locking pin 250 extends through distal endwall 220 through distal end hole 268 and extends into enclosed slot 218. Sliding support plate 254 rests against distal endwall 220, and locking pin spring 260 is not fully compressed. To engage and lock foot pedal 226, the operator pulls up on locking pin 250, thereby causing fixed support plate 258 to act against locking pin spring 260 and lift foot pedal 226 up, with foot pedal connector axle 244a sliding within enclosed channel 218. When connector axle 244a reaches the top of enclosed channel 218 (making contact with distal endwall 220) continued force on locking pin 250 compresses locking pin spring 260, so that locking pin 250 clears distal end hole 268 allowing foot pedal 226 to rotate away from the motorcycle.

When foot pedal 226 is in the engaged position, approximately normal to the motorcycle, the operator releases locking pin 250, allowing locking pin spring 260 to force locking pin 250 through locking hole 262 by acting against fixed support plate 254. As foot pedal 226 is lifted, sliding support plate 254 slides down locking pin 250 by force of gravity, assisted by sliding support plate spring 256 if it is present, to ensure locking pin 250 remains properly aligned to engage locking hole 262. Locking pin 250 could also be made long enough to pass completely through both sidewalls of enclosed slot 218 for more support. Posterior wall 236 rests against distal endwall 220, anterior lip 232 rests against the side of shaft 216, and posterior lip 234 locks distal locking corner 222 in place. At this point the operator can put his boot on foot pedal 226, crank the engine, stow foot pedal 226 by reversing the above steps, and ride off into the sunset, without the possibility that the kick arm pedal will drift out and catch their leg.

Locking pin 250 can easily be assembled using a shaft with a threaded end. Fixed support plate 258 can be tack welded at the desired position, determined by the desired amount of travel of locking pin 250 and compression characteristics of locking pin spring 260. Alternatively support plate 258 could be glued or pressed in place, or fixed by other methods known in the art. Locking pin spring 260 can then be placed over the shaft, which is then inserted into the foot pedal cavity and through the closed endwall, at which point handle 252 can be threaded onto the protruding end of the locking pin shaft. Other methods could also be used.

A locking device can be included to prevent foot pedal 226 from inadvertently being lifted. A locking device would preferably be a simple spring-loaded lever at the open end of foot pedal 226. The spring-loaded lever includes a hook which engages a raised lip on the side of shaft 216, or a tooth engaging a detent on the side of shaft 216. A transverse axle at approximately the midpoint of the lever allows the lever to rock, similar to a see-saw. A spring positioned under the upper half of the lever, where the operator's thumb would be positioned, biases the lever to the locked position—i.e. causing the hook or tooth to engage the raised lip or detent respectively. By pressing the upper half of the lever in, against the spring bias, the hook or tooth is disengaged, allowing the foot pedal 226 to be extended and engaged. Equivalent devices are known in the art, such as sliding locks, interrupted thread twist locks, and friction locks. The use of a locking device also allows for using a stronger sliding support plate spring 256, thereby assisting the operator in lifting foot pedal 226.

A slide locking kick arm shaft is preferably fabricated with stainless steel or chrome plated conventional or tool steel for strength, durability, corrosion resistance, and visual appeal. However, a slide locking kick arm could be made from any material with suitable strength and toughness characteristics, including aluminum and composites. The dimensions of a slide locking kick arm can be varied to accommodated riders of different sizes and different models of motorcycle or other motorized apparatus using kick starters.

Those skilled in the art will recognize that numerous modifications and changes may be made to the preferred embodiment without departing from the scope of the claimed invention. It will, of course, be understood that modifications of the invention, in its various aspects, will be apparent to those skilled in the art, some being apparent only after study, others being matters of routine mechanical, chemical and electronic design. No single feature, function or property of the preferred embodiment is essential. Other embodiments are possible, their specific designs depending upon the particular application. As such, the scope of the invention should not be limited by the particular embodiments herein described but should be defined only by the appended claims and equivalents thereof.

I claim:

1. A slide locking kick arm, comprising:
    a kick arm shaft attachable to an engine kick starter at a first end (12) of the shaft, said shaft comprising a first angled part (14) connected to said first end, and a second part (16) for receiving a foot pedal (26) extending from said first part, said second part comprising an enclosed slot (18) extending substantially the entire length of said second part, a distal end wall (20), a distal end locking corner (22);
    a foot pedal (26) slidingly attachable over the shaft second part, said foot pedal comprising:
        a first cavity (30) including an opening at one end for receiving said kick arm shaft second part;
        a second cavity extending from the opening of said first cavity, the second cavity comprising: a posterior wall (36); a posterior lip (34); two opposing lateral walls (40) extending from said posterior wall, said lateral walls including penetrations (38) for receiving a pedal connector; and an anterior lip (32) connecting the two lateral walls, said anterior lip located opposite from said posterior lip across the opening of said first cavity; and,
        a pedal connector axle (44) connecting through said sidewall penetrations (38) and interior slot (18);
    wherein, when said foot pedal (26) is extended, said foot pedal can be rotated away from said engine starter, and said foot pedal further comprises a locking pin and locking pin handle slidably through the closed end of said foot pedal, down the length of said first cavity, and partly into said second cavity
    A fixed support plate fixedly connected to said locking pin, positioned within said first cavity of said foot pedal
    A locking pin spring within said first cavity extending along said locking pin between said fixed support plate and the closed end of said first cavity
    A sliding support plate slidably attached to said locking pin between said fixed support plate and the distal end of said locking pin
    And further, wherein said kick arm shaft second part further comprises a locking pin receiving hole through said distal endwall and said locking pin locking hole through a sidewall of enclosed slot.

2. The collapsible motorcycle kick arm of claim 1 further comprising a sliding support plate spring extending along said locking pin (250) between said fixed support plate (258) and said sliding support plate (254).

3. The collapsible motorcycle kick arm of claim 1, wherein said foot pedal further comprises a raised retaining lip (28) extending radially outward from the closed end of said foot pedal.

4. The collapsible motorcycle kick arm of claim 1, wherein said pedal connector (44) comprises a threaded bolt (44a) extending through said sidewall penetrations (38) and said interior slot (18).

5. The collapsible motorcycle kick arm of claim 1, wherein said foot pedal (26) further includes a treaded outer surface.

6. The collapsible motorcycle kick arm of claim 1, wherein said locking pin handle is a closed loop.

* * * * *